United States Patent
Zahn et al.

(10) Patent No.: US 10,461,301 B2
(45) Date of Patent: Oct. 29, 2019

(54) BATTERY PACK FOR A HAND-HELD POWER TOOL AND METHOD FOR MANUFACTURING A CURRENT-CARRYING CONNECTION, PREFERABLY A CELL CONNECTOR OF A BATTERY PACK FOR A HAND-HELD POWER TOOL

(71) Applicant: Robert Bosch GmbH, Stuttgart (DE)

(72) Inventors: Wolf Zahn, Stuttgart (DE); Florian Schmehl, Ostfildern (DE); Joseph Baumgartner, Wildberg (DE)

(73) Assignee: Robert Bosch GmbH, Stuttgart (DE)

( * ) Notice: Subject to any disclaimer, the term of this patent is extended or adjusted under 35 U.S.C. 154(b) by 652 days.

(21) Appl. No.: 15/062,767

(22) Filed: Mar. 7, 2016

(65) Prior Publication Data

US 2016/0285067 A1 Sep. 29, 2016

(30) Foreign Application Priority Data

Mar. 23, 2015 (DE) .......... 10 2015 205 200

(51) Int. Cl.
*H01M 2/20* (2006.01)
*H01M 2/10* (2006.01)

(52) U.S. Cl.
CPC ......... *H01M 2/204* (2013.01); *H01M 2/1055* (2013.01); *H01M 2220/30* (2013.01)

(58) Field of Classification Search
CPC ...... H01M 2/204; H01M 2/1055; H01M 2/22; H01M 2220/30
See application file for complete search history.

(56) References Cited

U.S. PATENT DOCUMENTS

| | | | |
|---|---|---|---|
| 2009/0068555 A1* | 3/2009 | Fukuoka | H01M 2/204 429/160 |
| 2009/0075163 A1* | 3/2009 | Shevock | H01M 2/206 429/121 |
| 2009/0123830 A1* | 5/2009 | Kato | H01M 2/202 429/160 |
| 2010/0221590 A1* | 9/2010 | Reber | A01G 3/053 429/99 |
| 2014/0000927 A1* | 1/2014 | Hashimoto | H02G 5/005 174/68.2 |
| 2015/0072208 A1* | 3/2015 | Balk | B60R 16/03 429/121 |

* cited by examiner

*Primary Examiner* — Jonathan G Jelsma
(74) *Attorney, Agent, or Firm* — Norton Rose Fulbright US LLP; Gerard Messina (57) ABSTRACT

A battery pack for a hand-held power tool including a battery pack housing, the battery pack housing accommodating at least two battery cells, and at least one cell connector for connecting the battery cells in parallel and/or in series, the cell connector being connected to a pole of the first battery cell and to a pole of the second battery cell using a welding method, the cell connector including at least two at least partially overlapping, current-carrying cross-sectional areas in an unwelded area between the battery cells.

5 Claims, 4 Drawing Sheets

BATTERY PACK FOR A HAND-HELD POWER TOOL AND METHOD FOR MANUFACTURING A CURRENT-CARRYING CONNECTION, PREFERABLY A CELL CONNECTOR OF A BATTERY PACK FOR A HAND-HELD POWER TOOL

CROSS REFERENCE

The present application claims the benefit under 35 U.S.C. § 119 of German Patent Application No. 102015205200.1 filed on Mar. 23, 2015, which is expressly incorporated herein by reference in its entirety.

FIELD

The present invention relates to a battery pack for a hand-held power tool, and a method for manufacturing a current-carrying connection, preferably a cell connector of a battery pack for a hand-held power tool.

BACKGROUND INFORMATION

Electric hand-held power tools, for example, impact screw drivers, drills, angle grinders, jigsaws, circular saws, or planers for the needs of craftsmen or handymen usually have either an AC motor or a DC motor as the drive motor. While the former is generally supplied with alternating current from the grid via a power cable, the electrical power for supplying the DC motor generally comes from a so-called battery back, a rechargeable battery in a housing which may be coupled to the housing of the hand-held power tool, which is electrically connected to the current supply lines of the DC motor during the coupling of the two housings.

Battery packs of this type are basically conventional and have rechargeable batteries, generally a plurality of battery cells connected in parallel and/or in series. In relation to this application, a battery pack is thus understood as a battery packet, which is made up of multiple electrically interconnected battery cells and may store electrical energy, deliver the energy necessary for operating the hand-held power tool, and is accommodated interchangeably in a chamber, an interface, or the like of a hand-held power tool. The coupling of the battery pack to the hand-held power tool is carried out by plugging or inserting the battery pack into a complementary plug-in socket of the device housing, the battery pack interacting with the device housing of the hand-held power tool in such a way that upon coupling the battery pack to the device housing, the power tool is electrically connected and mechanically locked to the battery pack. The electrical contacting is carried out mostly in the area of the locking device.

It is generally provided to connect the battery cells or battery cell blocks to one another in series. In part, so-called conductive plates are used here as cell connectors for the series connection, and connect the respective complementary poles of the battery cells to one another. The cell connectors are usually fixed on the poles of the battery cells by a welding or soldering process, resistance welding, resistance spot welding in particular, being preferably used. During the manufacture of the cell connectors, materials like nickel or copper alloys and steel are preferably used.

In resistance spot welding, the join partners are situated in a lap joint and a welding current is applied in a locally limited area, the Joule heating which accompanies this causing a melting of the join partners in the area of a so-called weld nugget. Upon solidification of the melt, a punctiform, integrally bonded connection remains between the join partners.

The welding current flows between two generally rod-shaped electrodes, which are situated on the join partners in such a way that the welding current is transmitted in the joint between the join partners. The process is designed here in such a way that the largest electrical resistance, and thus the greatest heating, occurs in the area of the joint. In this way, it is achieved that the join partners melt first in the area of the joint or the weld nugget.

The process may be better controlled, if the largest resistance along the path, which the current travels through the join partners, is more distinct in the area of the weld nugget, and the current flows with greater concentration through this point. Undesirable effects which oppose an efficient process control result, for example, from the contact resistance prevailing between the electrodes and the join partners, and from the so-called parasitic shunt which flows through the join partners between the electrodes, but not through the weld nugget. This portion of the current does not contribute to the Joule heating of the weld nugget, and in this sense is lost to the welding process, and may, in the worst case, lead to damage at unforeseen points.

In general, the fixing of a cell connector on a pole of a battery cell is carried out in such a way that both electrodes are applied to the cell connector which in turn contacts the respective pole of the battery cell. In order that a sufficiently high proportion of the current flows through the joint between the cell connector and the battery pole and that the entire welding current is not lost in the shunt through the cell connector, the conductivity of the cell connector, on the one hand, and the contact resistance between the cell connector and the battery cell pole, on the other hand, must be adjusted to one another. It has thereby proven to be problematic that the cell connector is to have a preferably good conductivity between the battery cells in the installed state, as this ensures that the parasitic shunt becomes large relative to the usable welding current. A cell connector, intended for use in the battery pack, having a preferably low electrical resistance thus generally opposes an efficient and stable resistance spot welding process.

SUMMARY

A first object of the present invention is to circumvent the disadvantages listed above and provide a battery pack for a hand-held power tool, the battery pack including at least two battery cells which are electrically connected to one another via at least one cell connector, the cell connector having a high conductivity and being connected to the poles of the battery cells via reliable welded connections.

A second object of the present invention is to circumvent the disadvantages listed above and provide a method for welding a cell connector on a pole of a battery cell which is situated in a cell bracket of a battery pack for a hand-held power tool, the cell connector having a high conductivity, the welding process is well controllable, and which is thereby preferably flexibly usable, inexpensive, and simple to carry out.

These objects may be achieved by a battery pack and a method for manufacturing a battery pack for a hand-held power tool in accordance with the present invention.

According to the present invention, it is provided that the battery pack for a hand-held power tool has a battery pack housing for accommodating at least two battery cells and at least one cell connector, the battery cells being connectable in parallel and/or in series via the cell connector, and the cell connector being connected to a pole of the first battery cell and to a pole of the second battery cell using a welding method. The cell connector has at least two at least partially overlapping, current-carrying cross-sectional areas in a non-welded area between the battery cells.

In one preferred specific embodiment, the at least two cross-sectional areas are present in the form of at least two separate conductors, which are connected by welding at their respective end areas to the respective poles of the battery cells, an assigned welding process being carried out for each end area and pole.

In this way, a large, effective conductor cross section of the cell connector is available in total for the power transmission, whereby the low conductor resistance of the cell connector, required for operating the battery pack, may be implemented. During the individual welding processes, which are carried out only at the respective individual partial cross sections, i.e., at the separate conductors, the resistance in the parasitic shunt is, in contrast, relatively high, so that a large part of the welding current is actually available for melting the weld nugget, which enables a good controllability of the process and a high quality of the connection.

In one alternative specific embodiment, the separate conductors are situated on top of each other in the form of a stack, the respective assigned welding process connecting the respective conductors, according to the position of the conductors in the stack, either to the respective pole of the respective battery cell, or to the adjacent conductor in the stack.

This specific embodiment advantageously adds to the advantages described above with respect to the relationship of the electrical conductivity of the cell connector during the establishment of the connection and in the installed state, that the available installation space is utilized very well by the arrangement of the individual conductors in the stack.

In another alternative specific embodiment, the separate conductors are situated adjacent to one another, the respective assigned welding process connecting the respective conductors to the respective pole of the respective battery cell.

In yet another alternative specific embodiment, the cell connector is a continuous conductor which, by bending at least one bending point, is guided back and forth between the poles of the battery cells and thus forms a stack structure. This may be advantageous in terms of manufacturing considerations if in this way process steps for separating multiple conductors may be saved.

In a preferred specific embodiment of the variant with the continuous conductor, a first end area of the conductor is connected to the pole of the first battery cell by a separately assigned welding process; for each bending point, a first area assigned to the bending point and located upstream from the bending point being connected, depending on the position of the bending point in the stack structure, either to a part of the conductor lying below the first area in the stack structure, or to the pole of the second battery cell by a separate assigned welding process; and a second area assigned to the bending point and located downstream from the bending point being connected to the first area by a separate assigned welding process; and a second end area of the conductor being connected to the area of the conductor lying below the second end area in the stack structure by a separate assigned welding process.

In one alternative specific embodiment, the overlapping cross-sectional areas are connected to one another by a cross-sectional part which has a bending radius, the angle α over which the bend radius extends being between 170° and 190°, preferably 180°. In this way, a continuous, easy to handle conductor may be used, which, however, offers the same advantages as described above with respect to the conductivity.

In another preferred specific embodiment, two first end sections are located on the first cross-sectional area and are respectively connected by welding to one pole of a battery cell, two end sections, which are located on the second cross-sectional area, being respectively connected by welding to one of the first end sections.

Preferably, at least the areas of the cell connector, at which welding takes place, have slot-like recesses which are additionally used to reduce an electric shunt of the electrodes of the weld. By applying the electrodes to different sides of the slot-like recess, the path which the current must travel in the shunt may thus be expanded, which results in a concentration of the welding current in the weld nugget.

According to the present invention, it is provided that the welding process is a resistance spot welding process. The present invention may, however, also be carried out using other welding processes, for example a rollseam welding process.

Furthermore, the object is achieved by a method for manufacturing a battery pack for a hand-held power tool. According to the present invention it is provided that the method for manufacturing a current-conducting connection, preferably a cell connector between two battery cells of a battery pack for a hand-held power tool, includes the following method steps:

A) providing a first conductor and connecting a first end area of the conductor to a first pole of a first battery cell using a welding method, C) connecting a second end area of the conductor to a second pole of a second battery cell using a welding method, D) providing a second conductor and arranging the second conductor on the first conductor and connecting a first end area of the second conductor to the first end area of the first conductor using a welding method, F) connecting a second end area of the second conductor to the second end area of the first conductor using a welding method.

Preferably, additional conductors are situated in the stack structure according to method steps D through F and connected to the respective subjacent conductor.

Furthermore, the object may be achieved by an alternative method for manufacturing a battery pack for a hand-held power tool. According to the present invention it is provided that this method includes the following method steps:

A) providing a conductor and connecting a first end area of the conductor to a first pole of a first battery cell using a welding method, C) connecting a section of the conductor to a second pole of a second battery cell using a welding method, D) returning a second end area of the conductor to the first end area of the conductor, and connecting the second end area of the conductor to the first end area of the conductor using a welding method.

Moreover, the object is achieved by an alternative method for manufacturing a battery pack for a hand-held power tool. According to the present invention, it is provided that this method includes the following method steps:

A) providing a conductor and connecting a first end area of the conductor to a first pole of a first battery cell using a welding method, C) connecting a second end area of the conductor to a second pole of a second battery cell using a welding method, D) bending a free area of the conductor along an axis x, the axis x extending in parallel to a connecting axis z between the poles of the first battery cell and the second battery cell, the angle α over which a bend radius of the bend extends being between 170° and 190°, preferably 180°.

E) connecting the free area to the areas of the conductor, which are connected to the poles using welding.

According to the present invention, it is provided that the aforementioned welding method is a resistance spot welding method.

Basically, lithium-ion cells in particular may be used as the battery cells, since it is particularly possible with lithium-ion cells to integrate multiple battery cells into battery cell blocks, in which multiple battery cells are connected in parallel. It is thereby particularly advantageous that the cell bracket may accommodate battery cells having different diameters and lengths, whereby the use of the cell bracket or the cell carrier in different battery packs may be achieved.

In general, a hand-held power tool within the scope of the present application is understood to mean all hand-held power tools including a tool head, which is able to be set in rotation or translation and which is directly drivable via a gearing or a planetary gear, by a drive motor, for example, cordless screwdrivers, rechargeable drills, percussion drills, multifunction tools, saws, shears, grinders, and/or cordless combination drills. Transmission of electrical power is to be understood in this context in particular to mean that the hand-held power tool is supplied with power via the battery pack.

Additional features, application options and advantages of the present invention arise from the subsequent description of the exemplary embodiments of the present invention which are represented in the figures. One should take into consideration that the features shown have only a descriptive character and may also be used in combination with features of other further developments described above and are not intended to restrict the present invention in any way.

BRIEF DESCRIPTION OF THE DRAWINGS

The present invention is explained in greater detail below based on preferred exemplary embodiments, the same reference numerals being used for the same features. The figures are schematic.

DETAILED DESCRIPTION OF EXAMPLE EMBODIMENTS

Figure 1:
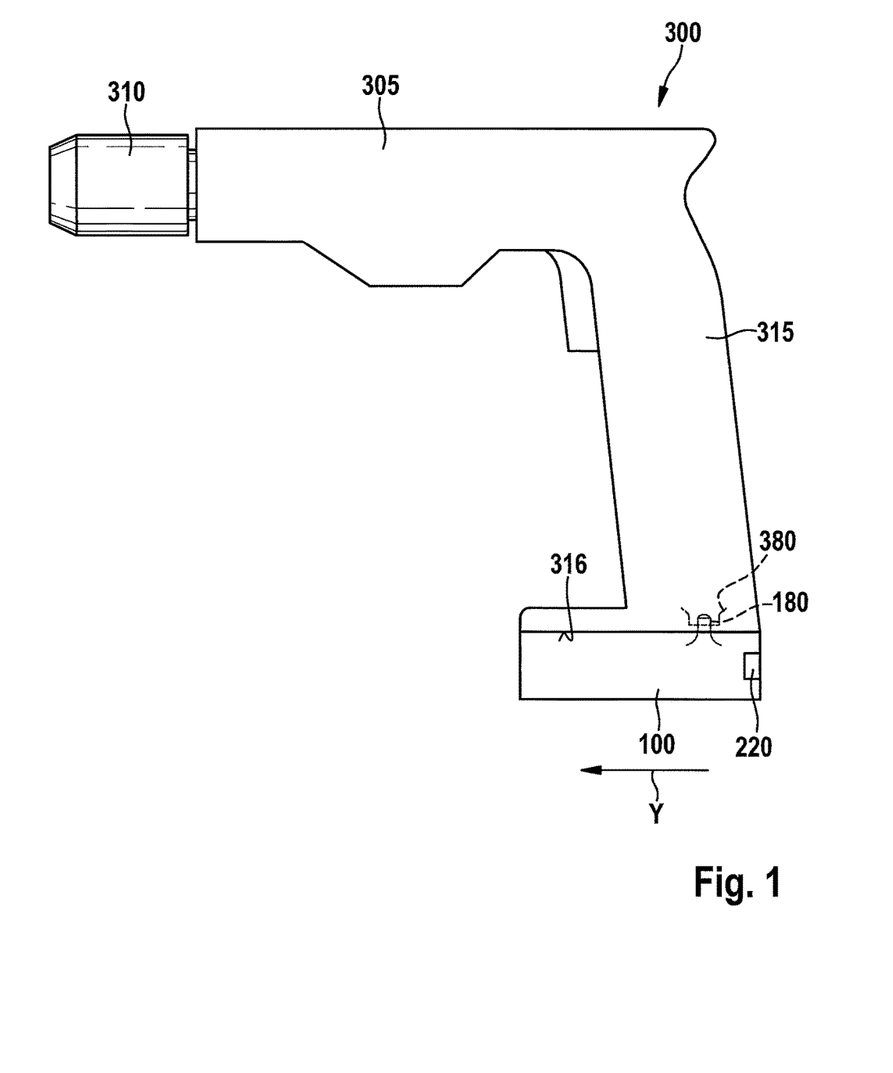
FIG. 1 shows a view by way of example of a hand-held power tool including a battery pack according to the present invention.

FIG. 1 shows an electrical device designed as a hand-held power tool 300. According to the specific embodiment shown, hand-held power tool 300 is mechanically and electrically connectable to the battery pack 100 for off-grid power supply. Hand-held-power tool 300 in FIG. 1 is designed for example as a cordless combi drill. However, it is pointed out that the present invention is not limited to cordless combi drills, but instead may be used in different hand-held power tools 300 which are operated by a battery pack 100. Hand-held power tool 300 has a base body 305, on which a tool holder 320 is fixed, and a handle 315 including an interface 380, on which a corresponding interface 180 of battery pack 100 according to the present invention is situated, in this case in the locked position. Battery pack 100 is configured as a slide-in battery pack.

Upon mounting battery pack 100 on hand-held power tool 300, an accommodating arrangement provided on hand-held power tool 300, e.g., guide grooves and guide ribs, engage with corresponding guide elements 110 of battery pack 100, battery pack 100 being inserted in a sliding direction y along the accommodating means of handle 315, battery pack 100 being inserted along a lower outer surface 316 of handle 315 oriented generally perpendicularly to the longitudinal direction of handle 315 into the battery pack accommodation of a hand-held power tool 300. In the position shown in FIG. 1, battery pack 100 is fixed on handle 315 of hand-held power tool 300 and locked by a locking arrangement. The locking arrangement include, among other things, a locking element and an actuating element 220. By actuating element 220, battery pack 100 may be disengaged from handle 315 of hand-held power tool 300.

Figure 2:
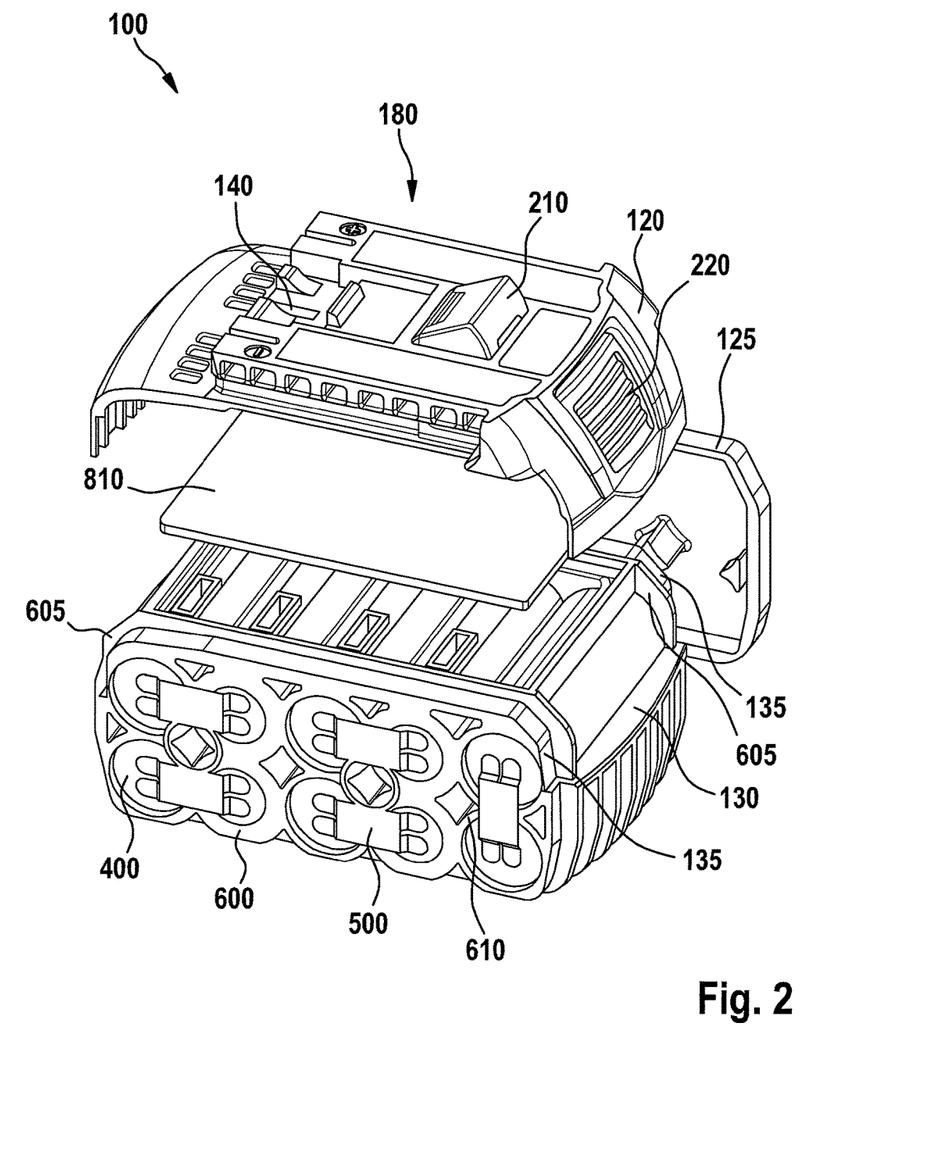
FIG. 2 shows a perspective exploded view of a battery pack according to the present invention.

FIG. 2 shows a battery pack 100 for a hand-held power tool 300 in an exploded view. The battery pack has a housing 110 made up of a first housing component 120 and a second housing component 130, the housing accommodating between first housing component 120 and second housing component 130 at least one, preferably, and shown here, a plurality of battery cells 400 connected in parallel or in series. Battery cells 400 are positioned between the two housing components 120, 130 preferably with either the aid of a cell bracket 600, as shown, or with the aid of cardboard sleeves to insulate battery cells 400 from one another. Battery pack 100 is configured in the embodiment variant shown as a slide-in battery pack.

For detachable mounting of battery pack 100 on a hand-held power tool 300 or on a charging device, battery pack 100 has an interface 180 for a detachable mechanical and electrical connection to a corresponding interface 380 of hand-held power tool 300 or a corresponding interface of the charging device. Upon mounting battery pack 100, an accommodating arrangement, e.g., guide grooves and guide ribs, of hand-held power tool 300 or of the charging device engage with corresponding guide elements of battery pack 100, battery pack 100 being inserted in a contacting direction y along the accommodating arrangement, and interface 180 of battery pack 100 being inserted into corresponding interface 380 of hand-held power tool 300 or the corresponding interface of the charging device. Battery pack 100 may be assigned to hand-held power tool 300 and/or to the charging device via interfaces 180, 380.

For locking battery pack 100 on handle 315, battery pack 100 is inserted in sliding direction y along handle 315, namely along a lower outer surface of handle 315 oriented generally perpendicularly to the longitudinal direction of handle 315. In the position shown in FIG. 1, battery pack 100 is locked on handle 315 by locking arrangement 200. Locking arrangement 200 includes, among other things, a locking element 210 indicated only schematically and actuating element 220. By actuating element 220, battery pack 100 may be detached from handle 315 of hand-held power tool 300. After unlocking battery pack 100, it may be separated from handle 315, namely by pushing battery pack 100 along a lower surface of handle 315 counter to sliding direction y. Upon mounting battery pack 100 on hand-held power tool 300, locking element 210 engages with a corresponding accommodation, not shown in detail, in handle 315 of hand-held power tool 300.

Interface 180 additionally includes contact elements 140 for electrical contacting of battery pack 100 to hand-held power tool 300 or to the charging device. Contact elements 143 are configured as voltage contact elements and are used as charging and/or discharging contact elements. Contact elements 144 are configured as signal contact elements and are used to transmit signals from battery pack 100 to hand-held power tool 300 or to the charging device, and/or from hand-held power tool 300 or the charging device to battery pack 100.

It is further apparent that battery pack 100 has a cell bracket 600 including a plurality of battery cells 400 connected in series, second housing component 130 directly forming cell bracket 600. The connection of the battery cells among one another is implemented via cell connector 500. It is further apparent that individual battery cells 400 are accommodated spaced apart from one another in cell bracket 600 for mechanical fixing. Cell bracket 600 is used, in addition to fixing battery cells 400 in battery pack housing 120, 130, to cool battery cells 400 as well and is made of a heat-conductive material, for example, aluminum, or a plastic. Furthermore, cell bracket 600 has sleeve-like insulating walls 620 so that individual battery cells 400 are separated and an electrical insulation of individual battery cells 400 from one another may be ensured. The heat transfer resistance between adjacent battery cells 400 as well as between battery cells 400 and cell bracket 600 is preferably low so that heat losses generated by battery cells 400 may be easily dissipated to the outside and an overheating of the battery pack in the interior may be prevented. A circuit board 810 of a battery pack electronics is fixed within battery pack housing 120, 130 on the surface of cell bracket 600. Furthermore, the battery pack electronics include contact elements 140 for establishing the electrical and mechanical connection between battery pack 100 and hand-held power tool 300 or between battery pack 100 and the charging device. The connection between the battery pack electronics and cell bracket 600 is ensured by attachment elements not described in greater detail.

In the specific embodiment shown, battery pack housing 110 additionally has two side components 125, only one of the two side components 125 being shown in FIG. 2. Side components 125 hold first housing component 120 and second housing component 130 together in the assembled state in such a way that a detachment of first housing component 120 from second housing component 130, or vice versa, is prevented. In the specific embodiment shown, it is clearly apparent that cell bracket 600 forms in areas an outer side of second housing component 130 or battery pack 100, alternatively cell bracket 600 being able to form in areas an outer side of first housing component 120 as well.

Moreover, cell connectors 500 are shown, via which an electrical interconnection of battery cells 400 among one another may be carried out in parallel and/or in series. Each battery cell 400 has a lateral surface 405 running parallel to a longitudinal axis x, lateral surface 405 being delimited by two end faces 410 extending perpendicularly to longitudinal axis x, on which the electrical poles of battery cells 400 are located.

Figure 3:
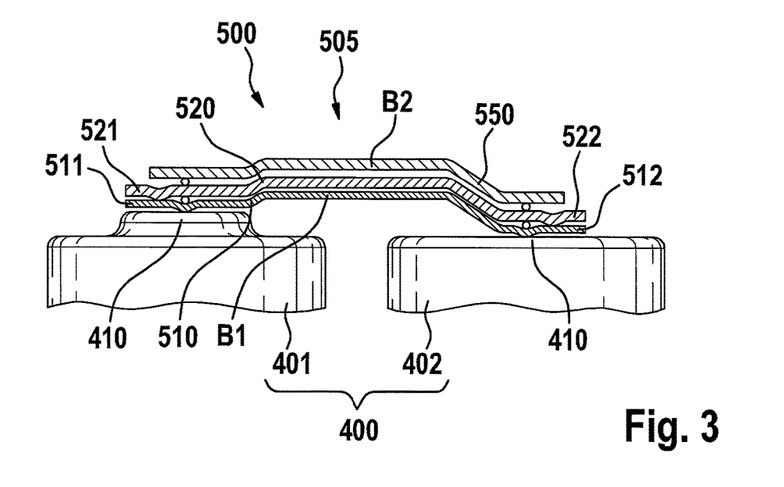
FIG. 3 shows a cell connector between the poles of two battery cells, the cell connector according to one specific embodiment of the present invention being made up of individual conductors which are situated on top of each other in the form of a stack.

FIG. 3 shows a first battery cell 401 and a second battery cell 402 whose poles 410 are electrically connected to one another by a cell connector 500. In the specific embodiment shown, cell connector 500 includes a first conductor 510, a second conductor 520, and a third conductor 530 which are situated on top of each other forming a stack. In the method according to the present invention, a first end area 511 of the first conductor is connected to pole 410 of first battery cell 401 using a welding process, and a second end area 512 is connected to pole 410 of second battery cell 402. In a next step, second conductor 520 is situated on top of first conductor 510 and a first end area 521 of second conductor 520 is connected to first end area 511 of first conductor 510 using a welding process, and a second end area 522 of second conductor 520 is connected to second end area 512 of first conductor 510. In a similar way, a first end area 531 of third conductor 530 is connected to first end area 521 of second conductor 520 using a welding process, and a second end area 532 of third conductor 530 is connected to second end area 522 of second conductor 520.

The stack-shaped structure of cell connector 500, shown in FIG. 3, is created in this way. Cell connector 500 has three separate, current-carrying, overlapping cross-sectional areas B1, B2, and B3, which are not welded to one another, between battery cells 401 and 402.

Figure 4:
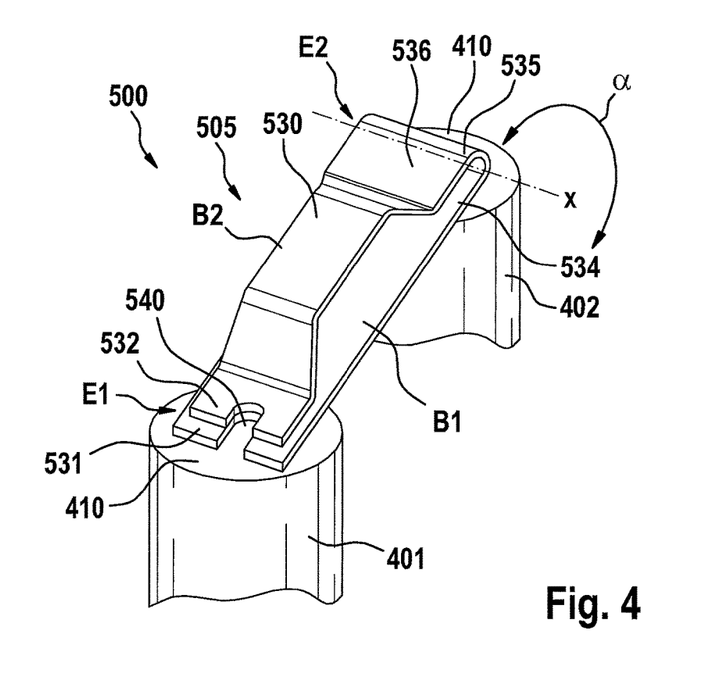
FIG. 4 shows a perspective view of a cell connector between the poles of two battery cells, the cell connector according to one specific embodiment of the present invention being guided back and forth between the poles.

FIG. 4 shows an alternative specific embodiment of the present invention, in which cell connector 500, which electrically connects first battery cell 401 and second battery cell 402 to one another, is a continuous conductor 530. In this case, cell connector 500 has, in an unwelded area 505, two separate current conducting cross-sectional areas B1 and B2 which overlap.

In this specific embodiment, conductor 530 is guided from pole 410 of first battery cell 401 to pole 410 of second battery cell 402 and, downstream from a bending point 535, guided back again to pole 410 of first battery cell 401. A first end area 531 is connected by its own welding point, preferably produced by resistance spot welding, to pole 410 of first battery cell 401, and a first area 534, upstream from bending point 535, is connected by its own welding point, preferably produced by resistance spot welding, to pole 410 of second battery cell 402. A second area 536 is connected by its own welding point, preferably produced by resistance spot welding, in turn to subjacent first area 534. During the manufacturing of cell connector 500, this weld between second area 536 and first area 534 is produced after the weld between first area 534 and pole 410 of second battery cell 402 was produced.

A second end area 532 is placed over first end area 531 during the manufacturing of cell connector 500 and the former is connected to the latter via its own welding point, preferably produced by resistance spot welding. This weld between first end area 531 and second end area 532 is produced during the manufacture of cell connector 500 after the weld between first end area 531 and pole 410 of first battery cell 401 was produced.

An angle α at bending point 535 is, in a preferred specific embodiment, between 170° and 190°, particularly preferably 180°.

In order to make the weld more controllable, a slot-like recess 410 is introduced in the areas of each end section 531, 532, on whose two edges the welding electrodes of the resistance spot welding are placed diametrically opposite one another during the welding. In this way, the path which the current of the parasitic shunt must cover is increased, so that a preferably large part of the applied welding current is guided through the joint and is thus used to establish the welded connection.

In another specific embodiment, conductor 530 may be guided back and forth as often as desired between poles 410 of battery cells 401 and 402 forming additional bending points; analogous to the preceding description, additional welded connections are established between the areas upstream or downstream from the bending points.

Figure 5:
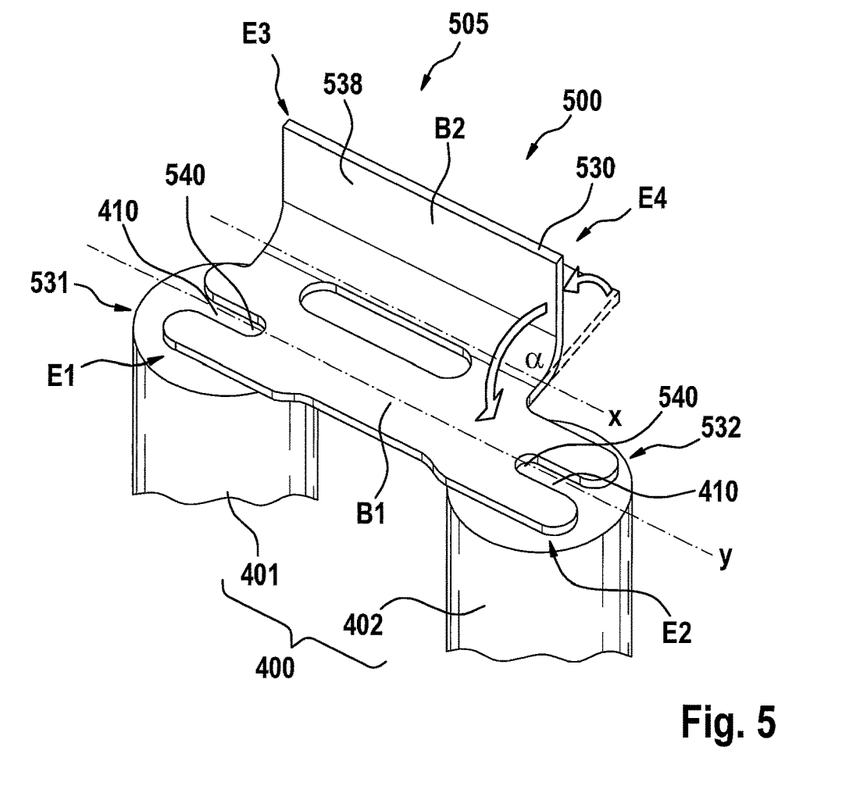
FIG. 5 shows a perspective view of a cell connector between the poles of two battery cells, the cell connector according to another specific embodiment of the present invention having overlapping cross-sectional areas in an area between the poles, the overlapping cross-sectional areas being connected to one another by a cross-sectional part which has a bending radius.

FIG. 5 shows an alternative specific embodiment of the present invention. Cell connector 500 which connects poles 410 of first battery cell 401 and second battery cell 402, has two cross-sectional areas B1 and B2, which form the separate conductors in the area 505 of cell connector 500 which is not connected by a weld, between battery cells 401, 402.

A first end section E1 of cross-sectional area B1 is connected to pole 410 of battery cell 401 by a welding point, preferably by resistance spot welding. In a similar way, a second end section E2 of cross-sectional area B1 is connected to pole 410 of battery cell 402 by a welding point, preferably by resistance spot welding.

As already described in conjunction with FIG. 4, slot-shaped recesses 410 shown in the specific embodiment of FIG. 5 are also introduced in the area of the welds, in order to be better able to control the welding process and to suppress the parasitic shunt.

As is shown in FIG. 5 based on the contours of cell connector 500 shown as dashed lines, cross-sectional areas B1 and B2 may be, for example, parts of a sheet metal part which is continuous in parts, at least a partial overlapping of cross-sectional areas B1 and B2 being achieved in area 505 between battery cells 401 and 402 by bending the sheet metal part at an angle α along an axis x. Angle α is, in the final position of cross-sectional areas B1 and B2 indicated by arrows, 180° in the specific embodiment shown; however it may also have other values between 170° and 190°. Cross-sectional area B2 has two end sections E3 and E4 which end up on top of end sections E1 and E2 due to the bending, end section E3 ending up on top of end section E1 and end section E4 ending up on top of end section E2 in the specific embodiment shown. In order to achieve a good electrical contact between cross-sectional areas B1 and B2, a welding point is established in each case between end section E3 and end section E1 and between end section E4 and end section E2. These welding points are preferably produced by resistance spot welding.

In this way, the current which flows between poles 410 of battery cells 401 and 402 may be fed at a preferably low electrical resistance into the two cross-sectional areas B1 and B2, whereby both cross-sectional areas B1 and B2 are available for current transmission between battery cells 401 and 402.

Figure 6:
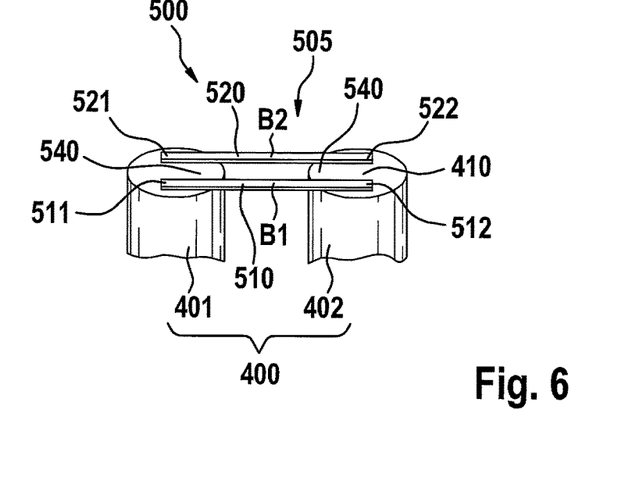
FIG. 6 shows a cell connector between the poles of two battery cells, the cell connector according to one alternative specific embodiment of the present invention being made up of two individual conductors situated adjacent to one another.

The specific example embodiment of the present invention shown in FIG. 6 shows cell connector 500 which is made up of two completely separated conductors 510 and 520, and whose cross-sectional areas B1 and B2 are not connected to one another via a bending point. The first end areas 511, 521 and the second end areas 512, 522 are each connected by a separate welding process, preferably resistance spot welding, to the respective pole 410 of battery cells 401 and 402.

In addition to the specific example embodiments described and illustrated, further specific embodiments are possible, which may include further modifications and combinations of features.

What is claimed is:

1. A battery pack for a hand-held power tool, comprising:
   a battery pack housing accommodating at least two battery cells, each battery cell having a lateral surface running parallel to a longitudinal axis, the lateral surface being delimited by two end faces extending perpendicularly to the longitudinal axis, wherein an electrical pole of the battery cell is located on each end face, and wherein the lateral surfaces of the battery cells are parallel to each other; and
   at least one cell connector to connect two battery cells of the at least two battery cells in at least one of parallel and series, the cell connector being connected to an electrical pole of the first battery cell and to an electrical pole of the second battery cell using a welding method, wherein the cell connector has at least two at least partially overlapping, current-carrying cross-sectional areas in an unwelded area between the electrical poles of the battery cells so that a current which flows between the electrical poles of the two battery cells is fed at a low electrical resistance into the at least two cross-sectional areas,
   wherein the cell connector is configured to connect the battery cells only on one lateral side of the cell connector,
   wherein:
   the cell connector includes a conductor;
   the connection of the cell connector to the pole of the first battery cell is by a welded connection of a first end area of the conductor to the pole of the first battery cell;
   the connection of the cell connector to the pole of the second battery cell is by a welded connection of a second end area of the conductor to the pole of the second battery cell;
   an edge of the conductor that is not welded to the poles of the first and second battery cells is bent over, along an x axis with a bend that has a bending angle of between 170° and 190°, onto, and welded to, the first and second end areas of the conductor; and
   the x axis is parallel or orthogonal to a connecting z axis between the poles of the first and second battery cells.

2. The battery pack as recited in claim 1, wherein the angle α is 180°.

3. The battery pack as recited in claim 1, wherein at least areas of the cell connector at which a welding is carried out have slot-shaped recesses which reduce an electrical shunt of the electrodes of the weld.

4. The battery pack as recited in claim 1, wherein the welding is a resistance spot welding process.

5. A method for manufacturing a current-conducting cell connector between two battery cells of a battery pack for a hand-held power tool, comprising:
   A) providing a conductor,
   B) connecting a first end area of the conductor to a first pole of a first battery cell using a welding method;

C) connecting a second end area of the conductor to a second pole of a second battery cell using a welding method;
D) bending a free area of the conductor along an x axis, the x axis extending in parallel or orthogonal to a connecting z axis, between the poles of the first battery cell and the second battery cell, the angle α over which a bending radius of the bend extends being between 170° and 190°; and
E) connecting a free area to the areas of the conductor which are connected to the poles by welding.

* * * * *